United States Patent [19]
Davis

[11] 4,453,497
[45] Jun. 12, 1984

[54] AUGMENTED HEAT TRANSFER METHOD AND APPARATUS

[75] Inventor: James S. Davis, Warren, Pa.

[73] Assignee: Struthers Wells Corporation, Warren, Pa.

[21] Appl. No.: 451,974

[22] Filed: Dec. 21, 1982

[51] Int. Cl.³ .............................................. F22B 1/00
[52] U.S. Cl. .................................. 122/4 D; 110/245; 110/263; 110/345; 110/347
[58] Field of Search ................... 122/4 D; 431/7, 170; 110/245, 263, 342, 344, 345, 347; 60/39, 181, 655, 683

[56] References Cited
U.S. PATENT DOCUMENTS

| | | | |
|---|---|---|---|
| 3,898,043 | 8/1975 | Schutte et al. | 122/4 D |
| 3,921,590 | 11/1975 | Mitchell et al. | 122/4 D |
| 4,084,545 | 4/1978 | Nack et al. | 122/4 D |
| 4,164,846 | 8/1979 | Moskowitz et al. | 110/263 |
| 4,312,301 | 1/1982 | Anson | 122/4 D |
| 4,355,601 | 10/1982 | Hattiangadi | 110/245 |

Primary Examiner—Edward G. Favors
Assistant Examiner—Steven E. Warner
Attorney, Agent, or Firm—Buell, Blenko, Ziesenheim & Beck

[57] ABSTRACT

The operation of gas turbines in combined cycle or cogeneration plants utilizing circulating fluidized beds is improved by increasing the temperature of the air supplied them. The temperature of bed solids circulating through an external heat exchanger is raised by combusting fuel in a combustion-augmenting zone through which the circulating solids pass. The gaseous products are combustion from that zone are introduced into the fluidized bed combustor. Thus the fluidized bed combustor operates at temperatures affording optimum sulfur removal by sulfur absorbing materials, the combustion-augmenting zone operates at an appreciably higher temperature to provide increased heat transfer to the compressed air for the gas turbine, and the off gases from the combustion-augmenting zone, which may be high in sulfur, are cooled in the combustor so as to bring about their desulfurization therein. Suitable apparatus is provided.

12 Claims, 3 Drawing Figures

AUGMENTED HEAT TRANSFER METHOD AND APPARATUS

BACKGROUND OF THE INVENTION

Combined cycle or cogeneration plants for generating electric power from solid or liquid fuel generally comprise a combustor for burning the fuel so as to generate steam for a turbine or other use and to heat a fluid for a gas or other fluid turbine. A fluidized bed combustor has advantages for such use. Heretofore, the practice has been to carry out the functions of raising steam and heating the fluid in the same combustor unit. The combustor may be operated at atmospheric pressure, as shown in U.S. Pat. No. 4,116,005, or with a pressurized bed as shown in U.S. Pat. No. 4,223,529. There are advantages in separating or decoupling the fluid heating function of the combustor from its steam raising function, as described in my U.S. Pat. No. 4,406,128, and captioned Combined Cycle Power Plant With Circulating Fluidized Bed Heat Transfer. In the power plant there described the combustor fluidized bed is caused to circulate through a heat exchanger external of the combustor to heat air for a gas turbine. The temperature of the air so heated delivered to the gas turbine is less than that of the combustor fluidized bed. When sulfur-containing fuel is burned in the combustor it is necessary to charge the combustor with sulfur sorbing material, normally limestone particles, along with the fuel to reduce sulfur emission in the flue gas. The optimum temperature range of combustion for this purpose is about 1450°–1700° F. The efficiency of fluid turbines increases materially with increase in temperature of the fluid supplied thereto, and it would be desirable to operate a fluid turbine unit of a combined cycle or cogeneration plant at higher temperatures, if sulfur emissions would not be increased thereby.

SUMMARY OF THE INVENTION

My invention is adapted to a combined cycle or cogeneration plant utilizing a fluidized bed combustor in which sulfur-containing coal or other fuel is burned at substantially atmospheric pressure and an external heat transfer unit through which a portion of the hot solids of the fluidized bed is circulated in heat-transfer relation with compressed fluid for a fluid turbine. I raise the temperature of the fluid supplied to the fluid turbine from my heat exchanger by adding heat to the circulating solids entering the external heat transfer unit. I do this by combusting fuel with air in contact with the circulating solids in a combustion-augmenting chamber external to the combustor and which may be external to the heat transfer unit or may by a part thereof, as will appear. The sulfur-containing products of combustion of the above mentioned chamber, which are at a temperature higher than the optimum for sulfur removal by limestone of the like sulfur-sorbing substances, are conducted to the combustor fluidized bed, where they come in contact with sulfur-sorbing particles charged with the combustor fuel. As the volume of those hotter gases is only a small fraction of the combustion gases in the combustor the hotter gases are cooled and desulfurized in the combustor.

My invention also contemplates the plant above described but including a second heat exchanger. The fluid heated in the first heat exchanger is one of high heat capacity, such as a liquid metal. This intermediate fluid is circulated through the second heat exchanger in heat-exchanging relation with a second fluid which is supplied to a fluid turbine.

DESCRIPTION OF PREFERRED EMBODIMENTS

Figure 1:
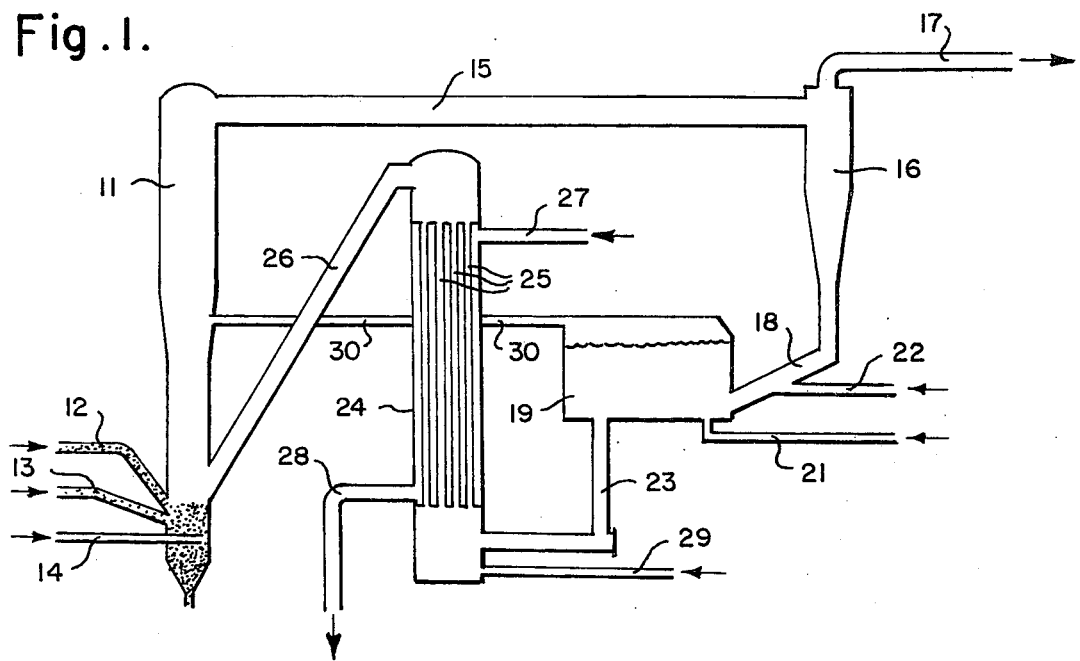
FIG. 1 is a simplified schematic of a fluidized bed combustor with a portion of its fluidized bed solids arranged to circulate through a combustion-augmenting chamber of my invention and an external air heater, in which the fluidized bed solids pass through the air heater tubes.

In FIG. 1 a fluidized bed combustor 11 is supplied with sulfur-containing fuel at 12, sulfur sorbing material such as limestone at 13, and primary air at 14. Hot fluidized bed solids and gaseous products of combustion are drawn off through duct 15 and passed into primary cyclone 16. The gaseous products of combustion are separated and transferred through duct 17 to heat recovery apparatus. The separated hot solids are delivered through duct 18 to my combustion-augmenting chamber 19. That chamber is also supplied with fluidizing and combustion air at 21 and with fuel at 22. The fuel is combusted with air in chamber 19 which is operated as a fluidized bed combustor in which the fuel is burned in contact with hot fluidized bed solids from cyclone 16. The fluidized bed solids which are there raised to a temperature higher than the temperature at which they were delivered to chamber 19, are passed through duct 23 to heat exchanger 24. Preheated transport air is introduced into heat exchanger 24 at 29. The hot solids suspension passes through tubes 25 in heat exchanger 24 and back through duct 26 into combustor 11. Compressed fluid, such as air, is introduced into heat transfer unit 24 at 27 so as to pass around tubes 25 and is conducted through duct 28 to a gas turbine, not shown. The gaseous products of combustion from combustion-augmenting chamber 19 leave therefrom through duct 30 and are returned to combustor 11.

Figure 2:
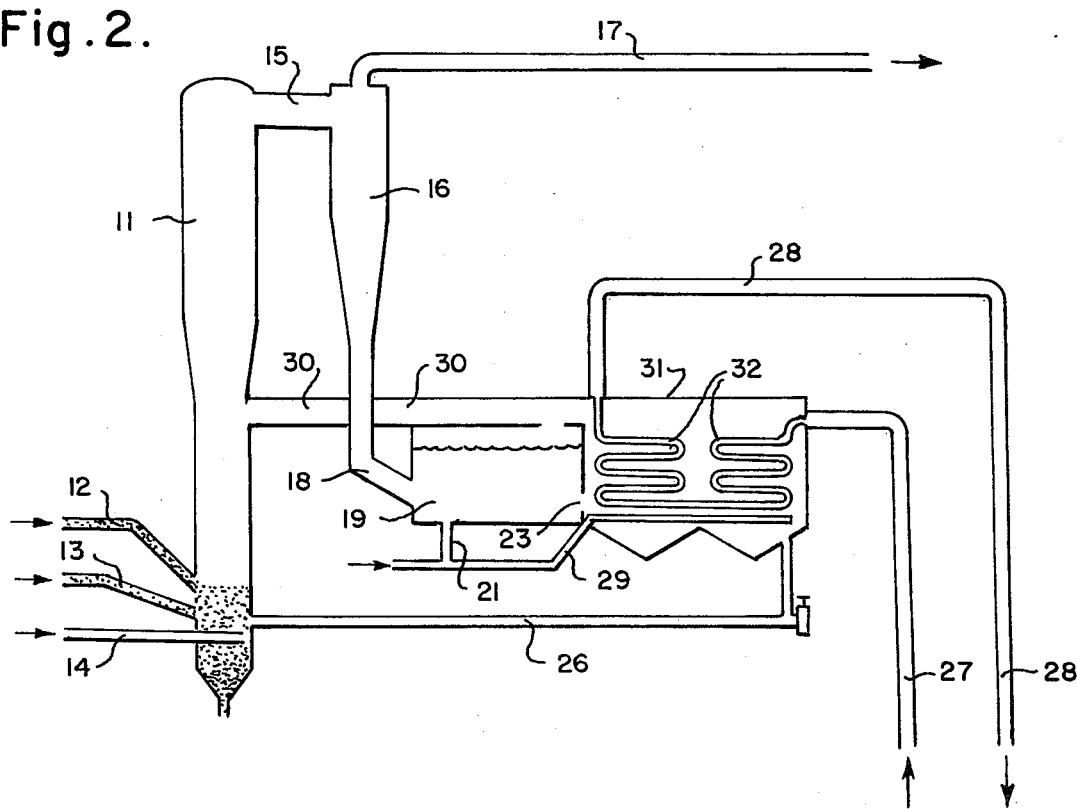
FIG. 2 is a simplified schematic of a fluidized bed combustor with a portion of its fluidized bed solids arranged to circulate through a combustion-augmenting chamber of my invention and an external air heater, in which the air to be heated passes through the air heater tubes.

In FIG. 2 an arrangement of apparatus similar to FIG. 1 is shown, but the heat exchanger 31 is one in which the fluid to be heated passes through tubes and the hot solids suspension is circulated around the tubes. Combustion-augmenting chamber 19 is shown as an integral part of heat exchanger 31. Hot solids from primary cyclone 16 pass through duct 18 into combustion-augmenting chamber 19 and exit therefrom at 23 into heat exchanger 31 where they pass around tubes 32 and return to combustor 11 through return duct 26. Air from a compressor is introduced into heat exchanger tubes 32 by duct 27 and is discharged therefrom through duct 28 to a gas turbine. As before, combustion and fluidizing air is introduced into combustion-augmenting chamber 19 at 21 and fluidizing air is also introduced into heat exchanger 31 at 29. The gaseous products of combustion are drawn off from combustion-augmenting chamber 19 through duct 30 and returned to combustor 11.

Figure 3:
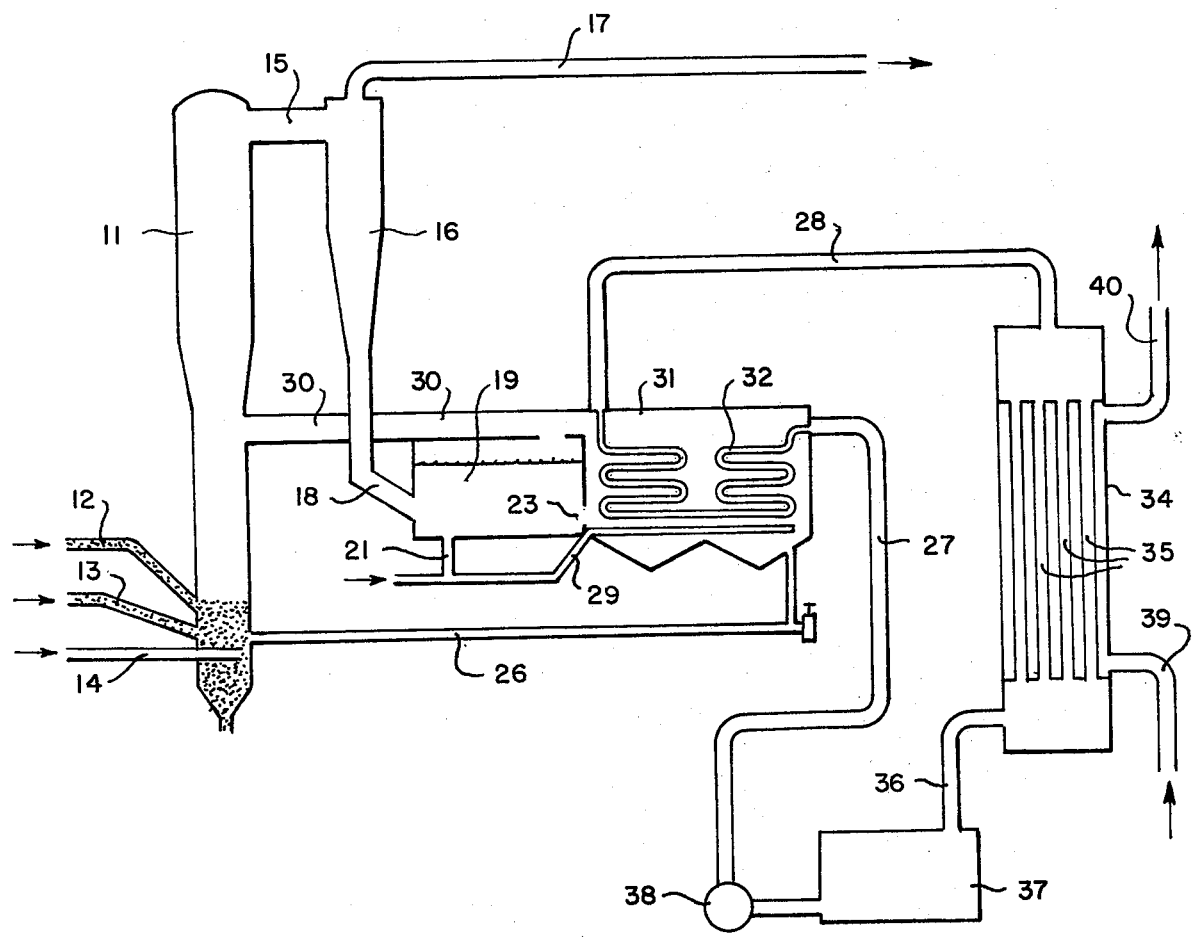
FIG. 3 is a simplified schematic of the apparatus of FIG. 2 but also including a second heat exchanger arranged as above described.

As I have mentioned, the apparatus of FIG. 3 includes the apparatus of FIG. 2 described above together with a second heat exchanger. The elements of FIG. 3 which are identical with those of FIG. 2 carry the same reference characters and will not be described again. The second heat exchanger 34 is of the same construction as heat exchanger 24 shown in FIG. 1. Duct 28 carries fluid from tubes 32 in heat exchanger 31 to tubes 35 in heat exchanger 34. That fluid is carried by duct 36 from heat exchanger 34 to fluid reservoir 37, from which is pumped by pump 38 back into tubes 32 of heat exchanger 31 through duct 27. A fluid such as air from a compressor is introduced into heat exchanger 34 around tubes 35 through duct 39 and is discharged therefrom through duct 40 to a gas turbine. Heat exchanger 34 could be of the same construction as heat exchanger 31, if desired.

The operation of my apparatus is substantially the same in the embodiments of FIGS. 1 and 2. The temperature in combustor 11 is maintained at that which optimizes sulfur removal from flue gases by the sulfur-sorbing particles. That temperature range is about 1450°–1700° F. The circulating solids from combustor 11, which may include fuel particles and sulfur-sorbing particles, lose some heat before they reach combustion-augmenting chamber 19. The additional fuel burned there with the combustion air also admitted raises the temperature of those solids to a preferred range of about 1600°–1900° F., and the circulating solids are conducted to heat transfer unit 24 or 31, as the case may be, at temperatures of only slightly less. The compressed air for gas turbine use is thus heated to a temperature considerably above any temperature which can be obtained by apparatus not employing my combustion-augmenting chamber and operated so as to minimize sulfur content of its flue gases. The gaseous products of combustion from my combustor-augmenting chamber, which may have a relatively high sulfur content, are returned to combustor 11 where the temperature is maintained at optimum value for sulfur removal, and as their volume is small compared to the flue gas volume from the combustor they cooled into the temperature range favorable for sulfur removal by the sulfur-sorbing material. Thus the sulfur content of the combined flue gases from my apparatus is not increased, but the temperature of the air delivered to the gas turbine is substantially increased.

The operation of my apparatus of FIG. 3 is substantially the same as that of the embodiment of my FIG. 2, to the extent of the elements common to both. The embodiment of FIG. 3, however, makes use of a high heat capacity intermediate fluid which circulates through heat exchangers 31, 34, reservoir 37 and pump 38. I prefer to use a liquid metal for that intermediate fluid. That fluid is heated to a preferred temperature range of 1600°–1900° in my augmented combustion heat exchanger 31 and transfers that heat to air or other fluid by heat exchange in my second heat exchanger 34. The fluid so heated is used to operate a fluid turbine. The use of a high heat capacity intermediate fluid permits a considerable reduction in the physical size of heat exchanger 31 and a relatively compact heat exchanger 34.

It is not essential that the additional fuel burned in my combustion-augmenting chamber be introduced at that point. The additional fuel may be particulate carbonaceous fuel carried over by the circulating solids from the fluidized bed combustor.

I claim:

1. The method of heating a fluid by the combustion of carbonaceous fuel containing sulfur together with particulate sulfur sorbing material to a temperature higher than the temperature range in which the sulfur sorbing material effectively sorbes sulfur from the carbonaceous fuel without increasing the sulfur content of the gaseous products of combustion beyond that associated with said temperature range, comprising combusting the carbonaceous fuel containing sulfur together with the particles of sulfur-sorbing material in a fluidized bed within said temperature range, and not exceeding about 1700° F., drawing off the gaeous products of combustion and entrained fluidized bed solids therefrom, circulating said fluidized bed solids through a separate combustion-augmenting chamber in tandem with a heat exchanging chamber in heat-exchanging relation in the heat exchanging chamber only with the fluid to be heated therein and back to said fluidized bed, introducing additional fuel into the separate combustion-augmenting chamber and combusting that fuel in that chamber to raise the temperature of the circulating fluidized bed solids in that chamber above said range, and not less than about 1600° F., thereby raising the temperature of the fluid heated by said solids in the heat exchanging chamber above said range, and generating sulfur-containing gaseous products of combustion, drawing off from the combustion-augmenting chamber the sulfur-containing gaseous products of combustion there generated, returning them to the fluidized bed, and removing sulfur therefrom in that bed.

2. The method of claim 1 in which the additional fuel introduced into the combustion-augmenting chamber is injected therein.

3. The method of claim 1 in which a fluidizing gas is introduced into the combustion augmenting chamber.

4. The method of claim 1 in which the sulfur-sorbing material is limestone and the temperature range maintained in the fluidized bed is about 1450° to 1700° F.

5. The method of claim 4 in which the temperature maintained in the combustion-augmenting chamber is about 1600° to 1900° F.

6. The method of claim 1 in which the fluid is a gas.

7. The method of claim 1 in which the fluid is a first fluid, the heat exchanging chamber is a first heat exchanging chamber, and in which the heated first fluid from the first heat exchanging chamber is circulated through a second heat exchanging chamber thereby raising the temperature of a second fluid therein.

8. The method of claim 7 in which the first fluid is a high heat capacity fluid.

9. The method of claim 8 in which the high heat capacity fluid is a molten metal.

10. In apparatus for heating a fluid by combustion of carbonaceous fuel containing sulfur together with particulate sulfur-sorbing material in a fluidized bed combustor and circulating entrained fluidized bed solids from the combustor through a heat exchanger external thereto so as to heat a fluid therein, the improvement comprising a combustion-augmenting chamber external of the combustor connected to receive entrained heated fluidized bed solids at temperature not exceeding about 1700° F. from the combustor and deliver them to said heat exchanger, means for introducing additional fuel into the combustion-augmenting chamber and combusting it therein to raise the temperature of the fluidized bed solids therein above the temperature range in which desulfurization by the sulfur-sorbing material is effective, and not less than about 1600° F. whereby the fluidized bed solids from the combustion-augmenting chamber raise the temperature of the fluid in the heat exchanger correspondingly, and means for returning the sulfur-containing gaseous products of combustion generated in the combustion-augmenting chamber to the combustor, whereby those products of combustion are cooled in the combustor to the said combustor temperature range and desulfurized therein.

11. Apparatus of claim 10 in which the fluidized bed solids circulate through tubes in the heat exchanger and the fluid passes around those tubes.

12. Apparatus of claim 11 in which the fluid is a first fluid and including a second heat exchanger and means for circulating the first fluid through the second heat exchanger in heat-exchanging relation with a second fluid therein, thereby raising the temperature of the second fluid.

* * * * *

UNITED STATES PATENT AND TRADEMARK OFFICE
CERTIFICATE OF CORRECTION

PATENT NO. : 4,453,497
DATED : June 12, 1984
INVENTOR(S) : James S. Davis

It is certified that error appears in the above-identified patent and that said Letters Patent is hereby corrected as shown below:

In the Abstract, line 8, "products are" should read --products of--.

Column 1, after the title, the following paragraph should be inserted:
--This invention relates to heat transfer method and apparatus used in transferring heat from a circulating fluidized bed combustor to a fluid such as air to be expanded in a gas turbine. It is more particularly concerned with heat exchangers which are external of the combustor.--

Column 3, line 44, "they cooled" should read --they are cooled--.

Claim 1, column 4, line 13, "gaeous" should be --gaseous--.

Signed and Sealed this

Twenty-third Day of October 1984

[SEAL]

Attest:

GERALD J. MOSSINGHOFF

Attesting Officer   Commissioner of Patents and Trademarks